Jan. 29, 1929.  
F. J. LORD  
POLICE CLUB  
Filed Sept. 3, 1927
1,700,440
2 Sheets-Sheet 1
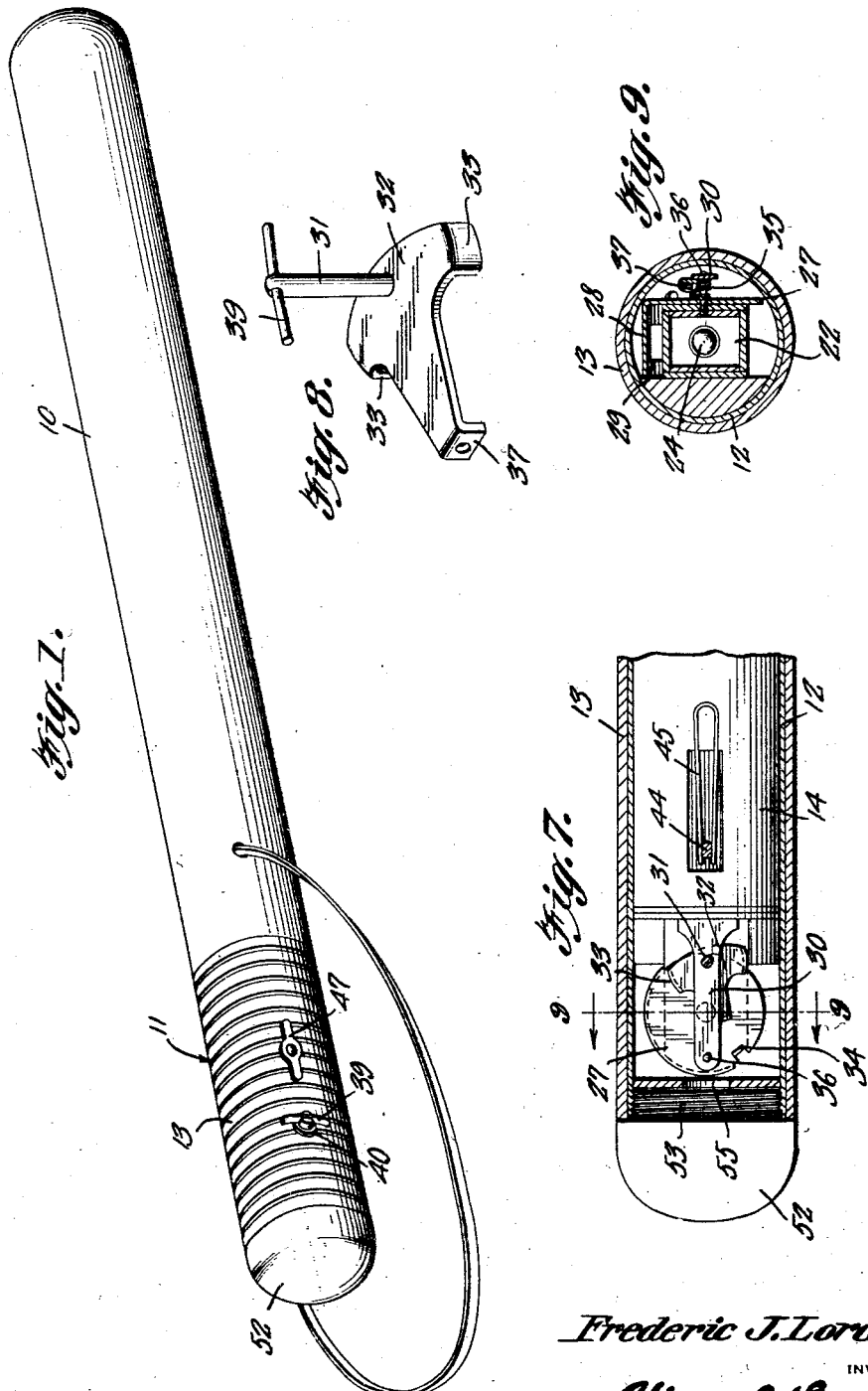
Frederic J. Lord,
INVENTOR
BY Victor J. Evans
ATTORNEY
WITNESS:

Jan. 29, 1929.
F. J. LORD
1,700,440
POLICE CLUB
Filed Sept. 3, 1927
2 Sheets-Sheet 2
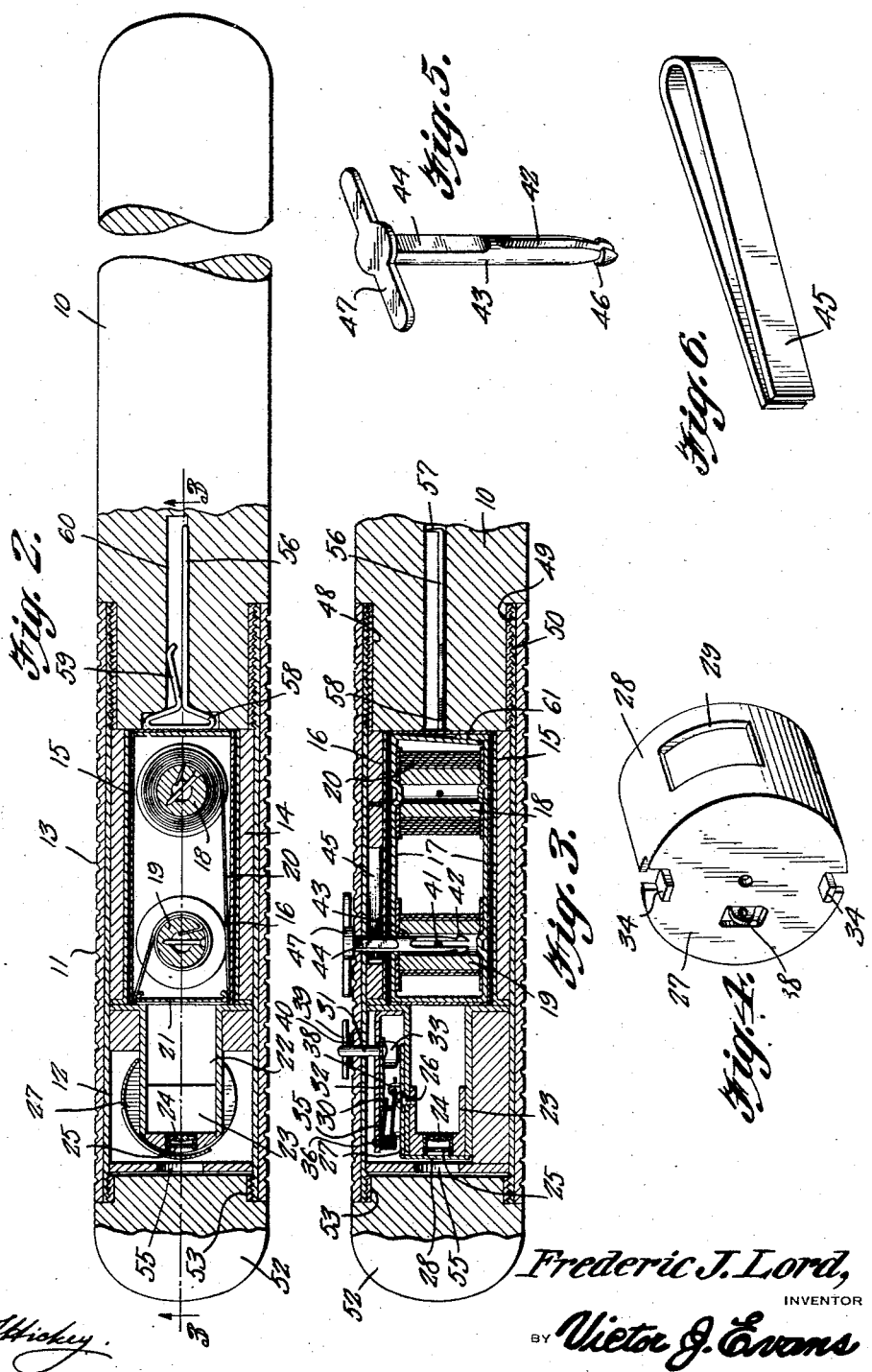
Frederic J. Lord,
INVENTOR Patented Jan. 29, 1929.

1,700,440

UNITED STATES PATENT OFFICE.

FREDERIC J. LORD, OF NEW YORK, N. Y.

POLICE CLUB.

Application filed September 3, 1927. Serial No. 217,401.

This invention relates to improvements in cameras and has for an object the provision of a camera which may be combined with and housed within a policeman's club, so that the camera may be conveniently carried and secretly used when desired.

Another object of the invention is the provision of means for housing the camera so that it will not be injured by shock occasioned by the use of the club.

Another object of the invention is the provision of means for constructing the club and arranging the camera therein so that the latter may be readily accessible.

Another object of the invention is the provision of a combined camera and club, which in addition to the above and other advantageous features, is simple and durable in construction and compact in form.

With the above and other objects in view the invention further consists in the following novel features, combination and arrangement of parts, which will hereinafter more fully be described, illustrated in the accompanying drawings and pointed out in the appended claims.

In the drawings:

Figure 1 is a perspective view of the invention.

Figure 2 is a view partly in elevation and partly in longitudinal section.

Figure 3 is a longitudinal section taken substantially on the line 3—3 of Figure 2.

Figure 4 is a detail perspective view of the shutter.

Figure 5 is a similar view of the film operating key.

Figure 6 is a like view of the key retainer.

Figure 7 is a view showing a portion of the handle section of the club in section, with parts of the camera in elevation.

Figure 8 is a detail perspective view of the shutter actuating member.

Figure 9 is a section on the line 9—9 of Figure 7.

Referring to the drawings in detail, wherein like characters of reference denote corresponding parts, the club as shown comprises a main section 10 and a handle section 11, the latter being of novel construction and providing a housing for a camera. The handle section comprises a metallic sleeve 12 which is surrounded by a gripping sleeve 13, the latter being formed of any suitable material, for example, fiber, and being circumferentially grooved to provide a secure grip. Located within the sleeve 12 is a filler member 14 and this member has formed therein a film compartment 15. This compartment is preferably provided with a metal lining 16 and is adapted to removably house a film holder. This film holder is preferably constructed in the same manner as the film holder of a co-pending application filed by me of even date. In fact, the entire camera structure is substantially the same as the camera structure disclosed in the application just mentioned. The film holder, therefore, includes relatively movable walls 17 between which are pivotally mounted film rollers 18 and 19. The roller 18 is the delivering roller and has mounted thereon a film 20, while the roller 19 is the receiving roller and receives the film from the roller 18. The film is threaded through openings provided in the end wall 21 of the film holder and is movable across the inner end of a focal passage 22. This passage extends from the film holder and is removably positioned within its outer end and holder 23. Mounted within the holder 23 is a lens 24 and a stop 25.

Pivotally mounted upon the outside of the focal passage as shown at 26 is a shutter which includes a disk 27 and arcuate flange 28, the latter having an opening 29 therein. The screw which forms the pivot 26 also acts to retain the holder 23 in place.

Mounted within the sleeve 12 and extending from one end of the filler 14 is an arm 30 and pivotally mounted upon this arm upon the shank 31 of a key is an actuating member 32. This member carries spaced lugs 33 which are movable into and out of the path of spaced stops 34 which are carried by the shutter 27. A spring 35 is coiled upon a stud 36 which is carried by the arm 30 and one arm of this spring passes through an apertured lug 37 carried by the actuating member 32 and through an apertured lug 38 carried by the shutter 28. The shank 31 of the key extends through the sleeves 12 and 13 and is provided with a finger piece 39. This finger piece has a slight frictional engagement with a preferably fiber disk or washer 40, the purpose being to permit free rotary movement of the key, yet hold the latter against accidental movement.

By means of the finger piece 39, the key may be rotated to operate the actuating member 32. As one of the stops 34 engages one of the lugs 33 of the member 32, when this member is moved pivotally, the engaged stop will be released and the spring 35 will operate to quickly move the shutter 27. As the shutter is moved, a momentary exposure will occur, movement of the shutter continuing until the other stop 34 engages the other lug 33.

In order to move the film, the roller 19 is provided with a pin 41 which is engaged by the bifurcated end 42 of a key 43. This key is similar to the key referred to in my before mentioned application and is provided with oppositely located flattened portions 44 for engagement by spring fingers 45. Accidental rotation of the key is thus prevented. The inner end of the key is provided with shoulders 46 which are also adapted to be engaged by the spring fingers 45 so as to limit outward sliding movement of the key. Thus, the key may be slid outward to remove or replace a film and film holder without fully withdrawing the key.

The outer end of the key is provided with a finger piece 47.

The main section of the club is reduced as shown at 48 and this reduced portion is provided with an externally threaded sleeve 49. The metallic sleeve 12 is internally threaded as shown at 50 and is adapted for threaded engagement with the sleeve 49, whereby the sections 10 and 11 of the club may be detachably connected. The opposite end of the handle section 11 is also internally threaded as shown at 51, while a cap 52, whose inner reduced portion is provided with an externally threaded sleeve 53, threadedly engages the end of the handle section so that the cap closes this end of the handle section. A disk 54 which is provided with an opening 55 is preferably arranged within the handle section in front of the lens.

For the purpose of conveniently removing the film holder there is provided a hook-like member 56. This member comprises a shank having a rightangularly arranged finger 57 at one end thereof and a handle or finger piece 58 at the opposite end. This handle or finger piece is of looped formation and has extending therefrom a spring arm 59. The member 56 is removably housed within a substantially T-shaped recess 60 provided in the main section of the club. As shown in Figure 2 of the drawing the spring finger 59 yieldingly engages the wall of the recess 60 so as to retain the member 56 in place. The engagement, however, is not such as to prevent the ready removal of the member 56.

When it is desired to remove the film holder, the sections 10 and 11 are separated and the member 56 removed from its recess or pocket. The finger 57 is then inserted between the overlapped ends 61 of the walls of the film holder, whereupon the latter may be readily withdrawn from the compartment 16.

The invention is susceptible of various changes in its form, proportions and minor details of construction, and the right is herein reserved to make such changes as properly fall within the scope of the appended claims.

Having described my invention, what I claim is:

1. In combination, a sectional club including a main section and a handle section, a camera housed within the handle section, said camera including a removable film holder and a shutter, means upon the outside of the club to operate the film holder, means upon the outside of the club to operate the shutter, means to removably secure the handle section to the main section, and means normally housed within the club for engagement with the film holder to remove the latter from the handle section.

2. In combination, a sectional club including a main section and a handle section, a camera housed within the handle section, said camera including a removable film holder and a shutter, means upon the outside of the club to operate the film holder, means upon the outside of the club to operate the shutter, means to removably secure the handle section to the main section, and a frictionally retained means normally housed within the club for engagement with the film holder to remove the latter from the handle section.

3. In combination, a sectional club including a main section and a handle section, said handle section including a metallic sleeve, a gripping sleeve surrounding the metallic sleeve, a filler member within the metallic sleeve, a camera housed within the filler member and spaced from the sleeve, means to operate the camera, means at one end of the sleeve for removable engagement with the main section of the club, and a cap for closing the other end of the sleeve.

4. In combination, a sectional club including a main section and a handle section, a film compartment in one section, a film holder removably positioned in the film compartment, means to detachably connect the club sections to provide a removable closure for the film compartment, a lens located adjacent the film compartment and means to move the film across the lens.

5. In combination, a sectional club including a main section and a handle section, one of said sections having a compartment therein open at one end, a disk positioned at the other end of the compartment and provided with an opening, a camera located within the compartment and having a lens located adjacent the opening in the disk, removable means to cover the disk and means to removably secure the club sections together to close the open end of the camera compartment.

In testimony whereof I affix my signature.

FREDERIC J. LORD.